Oct. 28, 1958  E. W. SCHEIBE  2,857,895
PUSH ROD AND OIL CONTROL VALVE
Filed May 3, 1957  2 Sheets-Sheet 1

INVENTOR.
Elias W. Scheibe
BY
S. C. Thorpe
ATTORNEY

United States Patent Office 2,857,895
Patented Oct. 28, 1958

2,857,895

PUSH ROD AND OIL CONTROL VALVE

Elias W. Scheibe, Grand Rapids, Mich., assignor to General Motors Corporation, Detroit, Mich., a corporation of Delaware Application May 3, 1957, Serial No. 656,931

11 Claims. (Cl. 123—90)

This invention relates to lubricating systems for internal combustion engines, pumps, etc., employing push rods for operating valves and the like mounted in the cylinder head through one or more intermediate linkage elements such as valve rockers, and wherein the bearing surfaces of the valves, rockers, etc. are to be supplied with oil from the engine main oil distributing system located below the cylinder head.

The invention has particular application to providing such oil feed to the overhead parts by using the push rod, which is made hollow for that purpose, as an oil conductor to the rocker from a hollow valve tappet which is slidably mounted in the engine in driving relation between the lower end of the push rod and the cam and is constantly supplied with oil as by a side port connected to the main engine oil gallery.

In a prior lubricating system of this general type means were devised for controlling the flow of oil to the valve rocker by a so-called "flutter valve" located within the tappet, which valve would reciprocate between alternately restricted and relatively open positions during engine operation. While this tappet mounted valve has proved highly successful, it has the disadvantage of not effecting as prompt oil delivery to the rocker as desirable during certain engine starting conditions, particularly after long shut-downs during which the oil has substantially all drained out of the push rod. Under such conditions, it is first necessary that the push rod must be filled again with oil before oil delivery to the rocker may commence, and such filling of the push rod is necessarily delayed by reason of the oil flow thereto having to first pass the flutter valve.

In accordance with this invention, I have eliminated the aforementioned drawback of the prior system by arranging the flutter valve at the upper end of the push rod instead of within the tappet, the lower end of the push rod being unobstructed for oil flow from the tappet with the result that filling of the push rod is effected promptly after each engine start, even though the oil viscosity may be relatively high, as in the case of cold start.

Several preferred forms for accomplishing my improved result will now be described, having reference to the drawings wherein.

Figure 1:
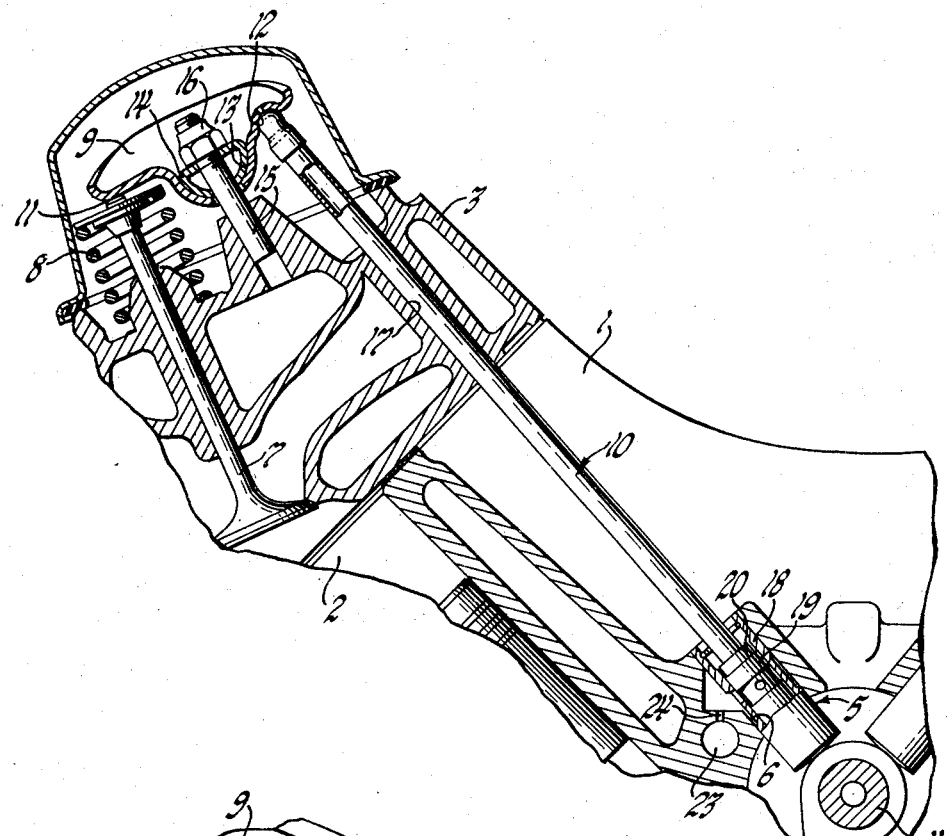
Figure 1 is a cross-sectional view of a portion of an internal combustion engine incorporating a push rod and oil control valve in accordance with my invention.
Figure 2:
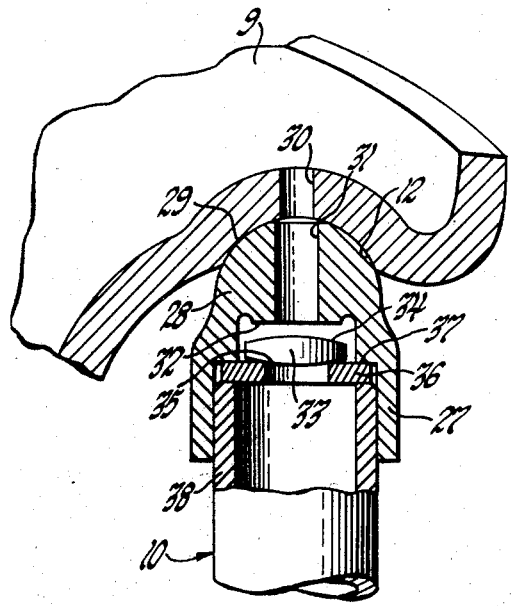
Figure 2 is an enlarged fragmentary view of the push rod upper end and rocker, showing the oil flow control valve associated therewith.
Figure 1A:
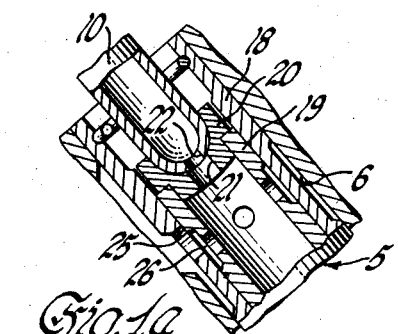
Figure 1A is an enlarged fragmentary view similar to Figure 1, showing the lower end of the push rod and its associated tappet partly in section.

Referring now in detail to Figures 1, 1A and 2 of the drawings, the engine shown is of the V-type including a cylinder block and crankcase 1, in each side of which one or more cylinders 2 are provided and closed at their upper ends by a cylinder head 3. Suitably journaled in the crankcase is a camshaft 4 which operatively engages a tappet 5 reciprocably guided in a bore 6 formed in the crankcase. An engine poppet valve 7, reciprocably mounted in the cylinder head and biased to its closed position by a valve spring 8, is operatively connected to the tappet 5 by a valve rocker 9 and a hollow push rod 10. The particular valve rocker 9 illustrated is in the form of a generally channel shaped metal stamping having downwardly presenting opposite end surfaces 11 and 12 in bearing engagement with the upper ends of the valve and push rod, respectively, and an intermediate upwardly presenting bearing surface 13 journaling on a bearing member 14 fixed to the cylinder head by a stud 15 and nut 16. Bearing surfaces 12 and 13 are spherically concave to socketably receive the spherically shaped upper end of the push rod and the bearing member 14, respectively, and the push rod has a sliding fit in a guideway 17 therefor extending through the cylinder head. The push rod, being thus laterally supported and socketed at its upper end in the rocker, serves to restrain rotation of the rocker about the axis of the stud 15 to the extent necessary to maintain the rocker end surface 11 in proper bearing engagement with the stem of the valve 7.

The particular tappet 5 shown is in the form of a hydraulic valve lifter having an outer cup-shaped cylinder 18 in which a nesting cup-shaped plunger 19 is slidably supported on a confined body of oil (not shown) in the lower end of the tappet cylinder 18. Resting on the upper end of the plunger is a push rod seat 20 having a central hole 21 which is in direct open and unrestricted communication at all times with the hollow interior of the push rod 10 through an end hole 22 in the latter, the upper face of the push rod seat 20 being recessed to socketably receive the push rod. The main engine oil gallery 23 is shown connected by ports 24, 25 and 26 in the crankcase, tappet cylinder and plunger, respectively, with the interior of the tappet plunger, whereby engine oil under pressure is available at all times to maintain the plunger and push rod full while the engine is running and to immediately refill these parts with oil upon starting the engine after a shutdown.

The upper end of the hollow push rod as shown in Figure 2 is tightly received within the side walls 27 of a generally cup-shaped end piece whose end wall 28 is spherically shaped on its upper surface 29 to conform and seat in the spherically concave bearing surface 12 of the rocker. This rocker bearing surface 12 is apertured at 30 to communicate with an outlet opening 31 which extends through the fitting end wall 28. Defining the entrance to this outlet opening 31 within the cup-shaped end piece is a flat seat 32 which is abuttable by a plate-like valve 33 whose seat engaging upper face 34 has a part-cylindrical curvature, such that when the valve is in abutment with its seat 32 oil flow past the valve is restricted but not completely blocked inasmuch as there is no full mating engagement with the surface 34 and the seat 32. As shown, the opposite surface 35 of the valve 33 is oppositely curved and is abuttable with a valve stop member in the form of a flat washer 36. This washer is retained between the upper end of the push rod tube 38 and an internal shoulder 37 formed on the side walls 27.

In operation, as is apparent, the flow control valve 33 has freedom to move into and out of abutment with its seat 32, being limited in this movement away from the seat 32 by the stop washer 36 and being laterally guided by the internal side wall surfaces of the push rod end piece between the shoulder 37 and the seat 32. Although the oil pressure acting against the under side of the valve 33 tends to normally maintain it in abutment with its seat, inertia forces acting on the valve 33 during its reciprocation with the push rod cause the valve to intermittently move into and out of abutment with its seat, thereby enabling a substantially greater flow of oil to the rocker through the opening 31 and aperture 30. The engine speed at which this inertia force on the valve 33 is sufficiently great to cause it to leave its seat can be predetermined for any given engine oil supply pressure by proper selection of the weight and diameter of the valve, and the diameters of the outlet opening 31 and the washer 36.

Figure 3:
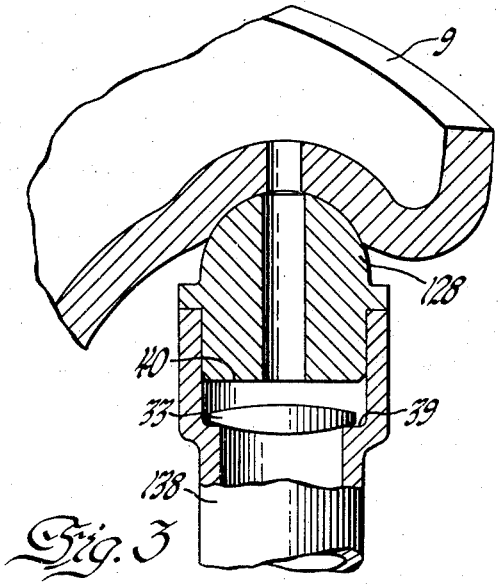
Figures 3–6 are views similar to Figure 2 but showing successively different modified forms of the invention.

Figure 3 shows a somewhat simpler mounting arrangement for the oil control valve 33 between an upwardly presenting shoulder 39 within the push rod 2 and the seat 40 for the valve. The shoulder 39 is formed by expanding the upper end of the push rod tube 138, and the end fitting 128 extends into this expanded tube portion. By thus forming the shoulder 39 the use of the stop washer 36 of Figure 2 is obviated. Operation is unchanged from that of Figure 2.

Figure 4:
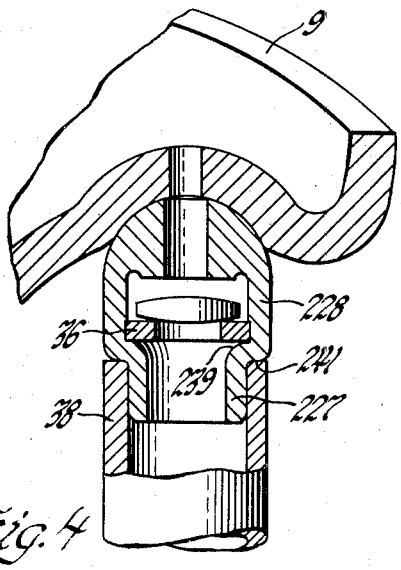

In Figure 4, the end piece 228 differs from that of Figure 2 in having its lower side wall portions 227 reduced in diameter to fit within the upper end of the push rod tube. Such "necking-in" of the side wall portions may be conveniently accomplished as an upsetting operation on the end piece which provides an internal shoulder 239 against which is located the valve stop washer 36 and an external shoulder 241 for seating the end piece against the end of the push rod tube.

Figure 5:
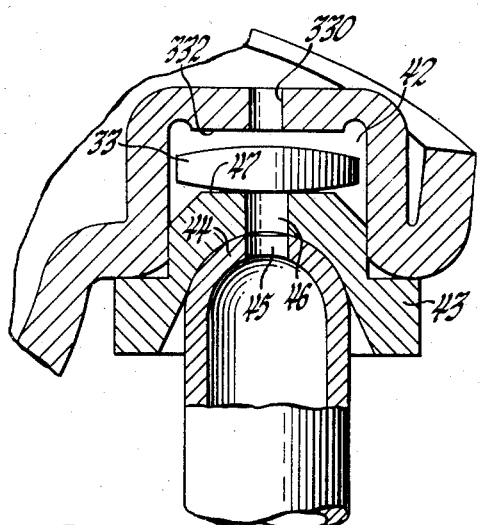

In the form shown in Figure 5 the rocker is formed by a downwardly open recess 42 at its push rod end, into which is pressed a push rod seat member 43 whose lower surface socketably receives the spherically ended upper portion 44 of the push rod. Aligned openings 45 and 46 are provided in the push rod upper end and the seating member 43, and the upper surface 47 of the member 43 serves as the stop for the flow control valve 33. The outlet opening to the rocker is the aperture 330 which is drilled into the end wall of the recess 42, and surrounding this outlet opening is the substantially flat seat 332 for the valve.

Figure 6:
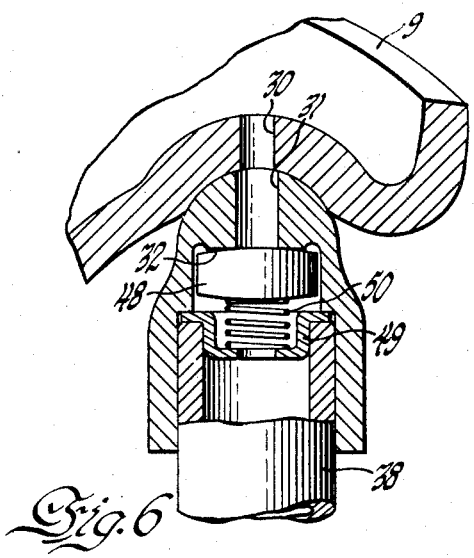

Figure 6 is substantially like that of Figure 2 except that the valve stop member 49 is in the form of a cup-shaped stamping which extends partially into the push rod tube to provide means for locating a spring 47 which biases the valve 48 against its seat 32. The valve 48 can thus be made of substantially greater mass than the valves 33 in the previous examples. Such increased mass, in conjunction with a selected stiffness for its biasing spring 50 affords a more precise determination of the engine speed at which the restricted oil flow rate is increased by unseating of the valve 48.

While several preferred embodiments of the invention have been disclosed, it is appreciated that numerous minor changes in the construction and arrangement of the parts may be made without departing from the spirit and scope of the invention as defined in the following claims.

I claim:

1. In a lubricating system for a valve gear of the overhead type including a poppet valve, a rocker drivingly connected to the valve, a driving cam remote from the rocker, means for both transmitting motion of the cam to the rocker and for conducting oil to the rocker including a tubular push rod open at both ends, a source of oil pressure in communication with the push rod at its end remote from the rocker, and a valve member having a lost motion connection with the rocker end of the push rod and located in the path of oil flow from the push rod to the rocker, said connection including a seat for said valve member, said seat and the portion of the valve member engageable therewith defining a restricted passageway for oil flow when the valve member is against said seat, said connection further including a stop limiting movement of the valve member away from its seat.

2. In a lubricating system for a valve gear of the overhead type including a poppet valve, a rocker drivingly connected to the valve, a driving cam remote from the rocker, means for both transmitting motion of the cam to the rocker and for conducting oil to the rocker including a tubular push rod open at both ends, a source of oil pressure in communication with the push rod at its end remote from the rocker, and a valve member having a lost motion connection with the rocker end of the push rod and located in the path of oil flow from the push rod to the rocker, said connection including a seat for said valve member between it and the rocker, said seat and the portion of the valve member engageable therewith defining a restricted passageway for oil flow when the valve member is against said seat, said connection further including a stop limiting movement of the valve member away from its seat.

3. In combination with a push rod for reciprocally transmitting movements between driving and driven elements of a cyclically operated linkage system, said push rod being hollow and having inlet and outlet openings at opposite ends thereof whereby fluid may be conducted between said elements during reciprocation of the rod, a valve for restricting fluid flow through the rod, a valve seat adjacent said outlet opening and facing the opposite end of the rod, said valve being movable into and out of abutment with said seat, said seat and valve having their coabuttable surface portions extending only partially about the axis of said outlet opening whereby said outlet opening is only partially blocked when said valve abuts said seat.

4. The invention of claim 3, wherein said push rod comprises a tube and an end piece in tight fitting concentric relation with the tube adjacent said outlet opening, said outlet opening being located in said end piece, and means including a shoulder provided on one of said tube and end piece loosely retaining said valve for limited movement into and out of abutment with said seat.

5. The invention of claim 4, wherein said shoulder is provided on said end piece and said means includes a valve stop member secured between said shoulder and the adjacent end of the tube, said stop member being disposed on the opposite side of said valve from said seat.

6. The invention of claim 5, including biasing means interposed between the valve and stop member for urging the valve toward its seat.

7. The invention of claim 3, wherein said push rod comprises a tube and a generally cup-shaped end piece having the portion of its side walls adjacent the open end thereof tightly embraced by the tube, said outlet opening being located in the end wall of the cup-shaped piece, the side walls of the cup-shaped piece being of greater internal and external periphery opposite the adjacent end of the tube to form internal and external shoulders, said external shoulder being in abutment with said adjacent end of the tube, and a valve stop member in abutment with said internal shoulder for accommodating limited movement of the valve in the direction away from its seat.

8. In combination with a push rod and a rocker for reciprocally transmitting movements between driving and driven elements of a cyclically operated linkage system, said push rod having one end pivotally associated with one end of the rocker, said push rod being hollow with an opening in its rocker end and said rocker having a passage in its push rod end for conducting fluid into the rocker from the interior of the push rod during operation of the linkage, said push rod and rocker having pivotally coacting bearing surfaces adjacent said opening, said rocker having a valve seat spaced from said bearing surfaces and defining the entrance to said passage, and a valve movable into and out of abutment with said seat for controlling fluid flow to said passage, said valve and seat having their coabuttable surface portions extending only partially about the axis of said entrance whereby said entrance is only partially blocked when said valve abuts said seat.

9. The invention of claim 8, wherein said rocker includes a rocker arm and a push rod seating member secured thereto, one side of said member being engageable by the valve to limit displacement of the valve in the direction away from said seat, said bearing surface coacting with said push rod bearing surface being provided on the opposite side of said member.

10. In a lubricating system for an engine or the like including a reciprocatedly actuated hollow push rod and a rocker pivotally connected thereto, said push rod having an oil inlet remote from the rocker, an oil outlet adjacent the rocker, means for conducting oil under pressure to said inlet, a valve seat adjacent the rocker end of the push rod, said seat facing the push rod end remote from the rocker and defining the entrance to said outlet, and a valve movable into and out of abutment with said seat to control oil flow from the push rod to the rocker.

11. In a lubricating system for an engine or the like having a bearing surface, a reciprocatedly actuated hollow tappet supplied with engine oil under pressure, a hollow push rod longitudinally adjacent and reciprocable with said tappet, said tappet and push rod having their interiors in oil flow communicating relation and defining an oil chamber, said chamber having an end wall at the remote end of the push rod from said tappet, said wall having an aperture communicating with said bearing surface, a plate valve movable within said chamber and normally urged against said wall by the oil pressure to restrict outward flow of oil through said aperture, said plate and wall having their oppositely facing surfaces in only partially abuttable relation about the periphery of the entrance to said aperture so as to prevent the plate from completely closing the aperture at any time.

References Cited in the file of this patent

UNITED STATES PATENTS

| | | |
|---|---|---|
| 1,515,344 | Joy | Nov. 11, 1924 |
| 1,624,497 | McAllister | Apr. 12, 1927 |
| 1,660,128 | Joy | Feb. 21, 1928 |
| 1,792,836 | Handwerker | Feb. 17, 1931 |
| 1,977,778 | Rice | Oct. 23, 1934 |
| 2,036,936 | Halford | Apr. 7, 1936 |
| 2,380,051 | Kettering | July 10, 1945 |